Patented Dec. 8, 1931

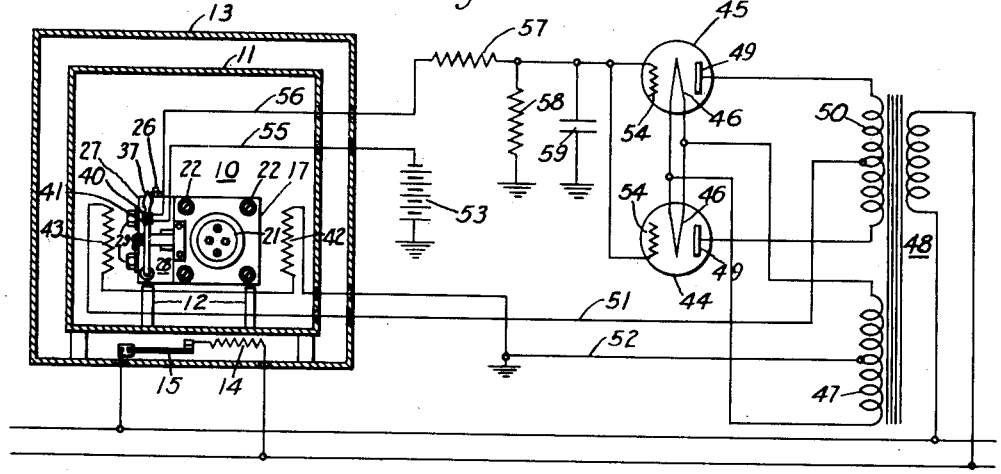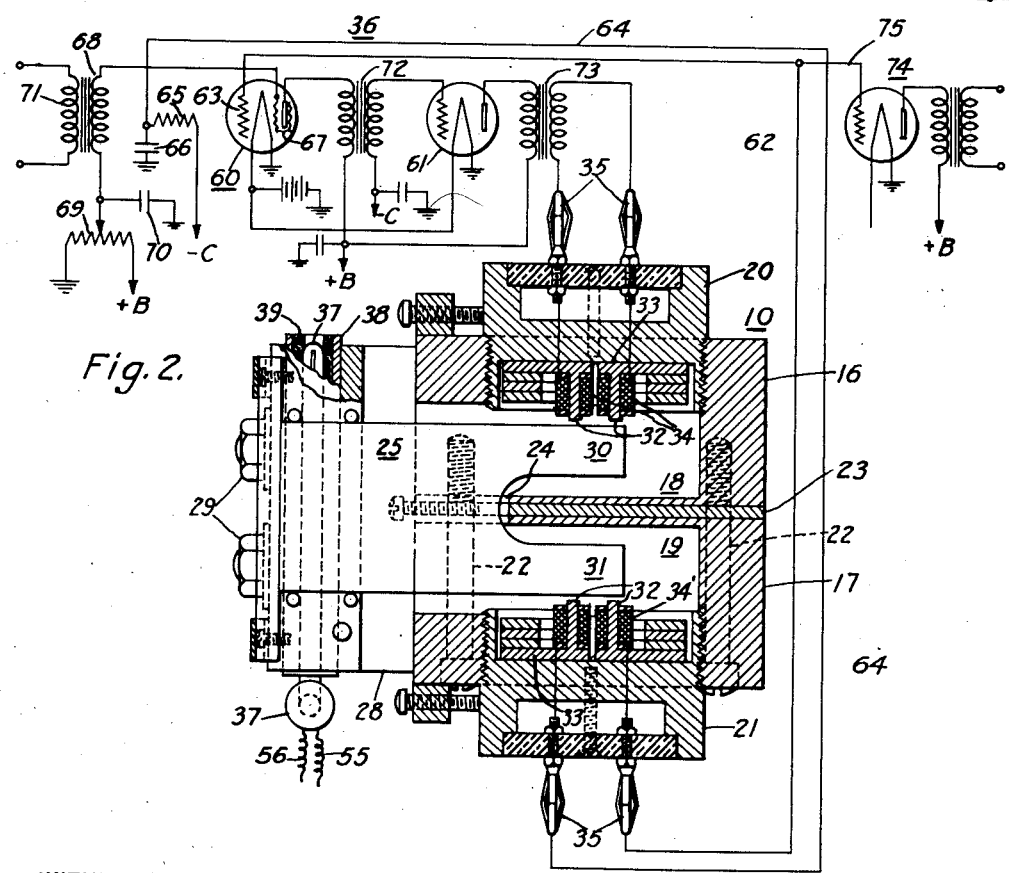

1,835,647

UNITED STATES PATENT OFFICE

RALPH N. HARMON, OF WILKINSBURG, PENNSYLVANIA, ASSIGNOR TO WESTINGHOUSE ELECTRIC & MANUFACTURING COMPANY, A CORPORATION OF PENNSYLVANIA

SYNCHRONIZING FORK TEMPERATURE CONTROL

Application filed January 29, 1931. Serial No. 512,036.

My invention relates to frequency-control apparatus and particularly to apparatus for adjusting the frequency of a tuning fork and for maintaining the temperature of the tuning fork constant.

It is well known that the fundamental frequency of a tuning fork varies with changes in the fork temperature. Prior to my invention, attempts have been made to regulate the temperature of the tuning fork by placing the fork in a heater box having a thermostat therein to keep the temperature of the air surrounding the fork constant. It has been found that, when the thermostat is located in this way to respond to the air temperature, the temperature of the tuning fork varies too much for many purposes.

An object of my invention is to provide temperature-control apparatus which will maintain the temperature of the tuning fork constant.

A further object of my invention is to provide means for controlling the amount of current supplied to the tuning-fork heater without causing destructive sparking at the thermostat contacts.

A still further object of my invention is to provide means for adjusting the frequency of the fork to the desired value.

In practicing my invention, I clamp the tuning fork between metallic blocks having a large thermal capacity. Heat is supplied to the tuning fork through these blocks. A mercury thermostat is so embedded in one of the metallic blocks that it responds to changes in the block temperature before an appreciable amount of heat has been transferred to the tuning fork.

The thermostat contacts control the amount of current supplied to the tuning-fork heater by opening or closing a circuit which applies a negative potential to the control grids of two three-electrode rectifier tubes. When the grids are negative, the rectifier tubes are so blocked that no plate current flows to the heater.

The tuning fork is driven by means of a screen-grid amplifier, the frequency of the fork being adjusted by changing the voltage applied to the screen grid.

Other features and advantages of my invention will appear from the following description, taken in connection with the accompanying drawings, in which:

Figure 1 is a diagrammatic view of the apparatus and electrical connections employed in practicing my invention, and Fig. 2 comprises a sectional view of the tuning fork holder and a diagrammatic representation of the connected apparatus and circuits.

Referring to the drawings, the apparatus comprises a tuning-fork holder 10 supported in a heater box 11 by means for supporting columns 12. The heater box 11 is enclosed by another heater box 13 for preventing too great variations in the temperature of the surrounding atmosphere. The temperature of the air between the boxes 11 and 13 is kept approximately constant by means of a heater winding 14 connected in series with a bimetallic thermostat 15.

The tuning-fork holder 10 is of the same construction as that described in Patent No. 1,743,178, issued to Lester J. Wolf, January 14, 1930, and assigned to the Westinghouse Electric & Manufacturing Company. It comprises two solid metallic blocks 16 and 17, preferably of brass, the blocks having holes 18 and 19, respectively, drilled off center therein. The blocks have larger threaded holes drilled at right angles to the holes 18 and 19 and communicating with them in which electromagnet driving units 20 and 21 are supported. The blocks 16 and 17 are clamped together by means of bolts 22, with their thin walls adjacent to each other and with a sheet 23 of magnetic material between them. In this way, two wall portions are formed which are separated by a thin partition of magnetic material and non-magnetic material. A square notch 24 is cut in the middle upper edge of the partition.

The tuning fork 25 is clamped, by means of bolts 26, between two solid metal blocks 27 and 28, preferably of brass. These blocks are secured, by bolts 29, to the blocks 16 and 17 in such positions that a portion of the tuning fork 25 is located within the notch 24 cut in the partition, while the prongs 30 and 31 are located within the holes 18 and 19.

The tuning-fork driving elements comprise telephone-receiver units 20 and 21 having pole pieces 32 adjacent to the prongs 30 and 31 of the tuned fork. The pole pieces 32 are soft-iron members attached to the poles of a permanent magnet 33. They have coils 34 and 34' mounted thereon which are connected to the binding posts 35 and 35', respectively. The driving elements 20 and 21 are connected to the input and output, respectively, of an amplifier 36, as explained hereinafter.

In accordance with my invention, a thermostat 37 is held in intimate contact with one of the blocks of the tuning-fork holder 10. In the example illustrated, this is done by placing the thermostat in a hole through the brass block 28. The mercury thermostat 37, which may be of any well known construction, is fastened in a brass tube 38 by means of a heat-conducting wax 39. The external diameter of the tube 38 is such that it will fit snugly into the hole.

The thermostat 37 is provided with two contact points 40 and 41 which so extend into the glass tube of the thermostat that, when the tuning fork holder 10 is heated sufficiently, the mercury will electrically connect the two contact points.

The tuning-fork holder is heated by means of two heater coils 42 and 43 which are preferably spaced away from the fork holder. Then heater coils are supplied with heating current from a double-wave rectifier which comprises two three-electrode vacuum tubes 44 and 45.

The filaments 46 of the vacuum tubes are heated by alternating current supplied from the secondary 47 of a transformer 48. Plates 49 are connected to opposite ends of a high-voltage secondary winding 50. The heater windings 42 and 43 are connected to the rectifier through a conductor 51 which is connected to the mid-point of the plate secondary winding 50 and through a conductor 52 which is connected to the mid-point of the filament winding 47.

When the thermostat contacts 40 and 41 are electrically connected, a biasing battery 53 is connected to grids 54 through a conductor 55, the thermostat contacts 40 and 41, a conductor 56 and a resistor 57. The grids 54 are preferably connected to ground through a high-resistance grid leak 58 which is shunted by a condenser 59, the condenser 59 being for the purpose of reducing "inductive kick" in the system.

In operation, the rectifier supplies current to the heater coils 42 and 43 so long as the metallic blocks comprising the fork holder 10 are below a predetermined temperature. As soon as this temperature is exceeded, the mercury column in the thermostat 37 rises to connect the negative terminal of the biasing battery 53 to the grids 54 of the rectifier tubes. The tubes are blocked immediately, and the flow of current through the heater windings 42 and 43 ceases. As soon as the temperature of the metallic blocks falls below a predetermined value, the biasing battery 53 is disconnected from the grids 54, and current again flows through the heater windings.

By placing the thermostat 37 in one of the heavy metallic blocks, the temperature changes in the fork 25 are kept very small, since any increase or decrease in the temperature of the block is stopped before the temperature change has been transmitted to the fork. The thermal capacity of the heavy blocks comprising the fork holder is so great that temperature variations are smoothed out as the heat is transmitted through the blocks to the tuning fork.

While it may appear, at first glance, that the direction of heat flow is from the outside of the fork holder to the fork, this is not believed to be the case, since the coil 34 is supplied with enough current from the amplifier 36 to make it act as a heater coil. Also, a small amount of heat is generated by the movement of the fork itself. Because of the heat generated inside the fork holder, it appears that the heat flow is from the inside of the fork holder to the outside of the holder. The rate of heat flow is regulated by the temperature of the outside of the fork holder, as controlled by the thermostat 37.

One reason that the thermostat must be responsive to the temperature of the fork holder itself is because, in adjusting the fork frequency by means of the amplifier 36, described hereinafter, the current flowing through the driving coil is changed. Therefore, the temperature of the fork holder is changed, and this change in temperature does not affect a thermostat in the air surrounding the fork holder promptly enough to hold the frequency constant.

The reason for the change in current in the coil 34 when the frequency of the fork is adjusted will be apparent from the following description of the means employed for making the frequency adjustment.

Referring to Fig. 2, the tuning fork 25 is driven by means of an amplifier 36 comprising a screen-grid tube 60 and a three-element tube 61. The pick-up coil 34' is connected to the amplifier input through a conductor 62 connecting one end of the coil 34' to the control grid 63 of the tube 60. The other end of the coil 34' is connected to a source of biasing voltage (not shown) through a conductor 64 and a resistor 65. A by-pass condenser 66 is provided.

The screen grid 67 is connected to the positive terminal of a voltage source (not shown) through the secondary 68 of an audio-frequency transformer and through a potentiometer 69 for adjusting the fork frequency. A condenser 70 by-passes the potentiometer 69 and voltage source.

The primary 71 of the audio-frequency transformer is connected to a source of current of constant frequency which is transmitted over a telephone line or radio channel for synchronizing a plurality of radio transmitters.

The output of the screen-grid tube 60 is coupled to the input of tube 61 through an audio-frequency transformer 72. The output of tube 61 is coupled to the driving coil 34 of the fork through an audio-frequency transformer 73.

In operation, the amplifier 36 is so adjusted that, independently of the synchronizing current supplied from the primary 71, the fork 25 oscillates at a frequency very close to that of the synchronizing current. Then, when the synchronizing current is impressed on the screen-grid 67, the fork is pulled into step therewith.

The fork amplifier 36 is connected to an output amplifier 74 through a conductor 75. The output amplifier 74 supplies energy of a frequency equal to that of the synchronizing current to frequency multipliers (not shown) which generate a carrier wave for the transmitting station. This general system for synchronizing several broadcasting stations is described and claimed in Patent 1,781,263 issued to Lester J. Wolf November 11, 1930, and assigned to the Westinghouse Electric and Manufacturing Company.

As previously stated, the fork frequency is brought close to the frequency of the synchronizing current by varying the potential on the screen grid 67 by means of the potentiometer 69. I believe that the main reason this adjustment changes the fork frequency is that it changes the phase of the voltage across the driving coil 34 with respect to the voltage across the pick-up coil 34. The phase relation of these two voltages is varied because a change in screen-grid potential changes the plate-filament resistance of the tube 60 to increase or decrease the resistance of the inductive (or capacitive) plate circuit.

A change in the screen-grid potential may affect the fork frequency also because of a change in wave form. Another reason that changes in screen-grid potential affect the fork frequency is that the current supplied to the driving coil 34 will be changed as previously mentioned. This change in current is kept small by operating the screen-grid tube 60 above its saturation point, and the change probably does not affect the fork frequency to any large extent. However, the change in current in the coil 34 is an additional reason why it is desirable to put the thermostat in the fork holder.

The term "tuning fork" which is used in the claims includes vibrating reeds and other vibrating mechanical elements which may be substituted for the fork illustrated in the drawings.

Various modifications may be made in my invention without departing from the spirit and scope thereof, and I desire, therefore, that only such limitations shall be placed thereon as are imposed by the prior art and are set forth in the appended claims.

I claim as my invention:

1. Frequency-control apparatus comprising metallic blocks, a tuning fork clamped between said blocks, means for heating said blocks, and means, including a thermostat embedded in one of said blocks, for controlling the amount of heat supplied by said heating means.

2. Frequency-control apparatus comprising a tuning fork, a metallic block in contact therewith, means for supplying heat to said block for heating said fork, and means, including a thermal element in contact with said block, for controlling the temperature of the fork.

3. Frequency-control apparatus comprising a tuning fork, a metallic block in contact therewith, means for supplying heat to said block for heating said fork, and means, including a thermostat embedded in said block, for controlling the temperature of said fork.

4. Frequency-control apparatus comprising a heater box, a tuning fork therein, a metallic block in contact with said fork, means spaced away from said block and fork for supplying heat thereto, and means, including a thermal element embedded in said block, for controlling the temperature of said fork.

5. Frequency-control apparatus comprising a heater box, a tuning fork therein, a metallic block in contact with said fork, means for supplying heat to said block for heating said fork, and means for maintaining the temperature of said fork substantially constant, said last means comprising a mercury thermostat having a portion thereof embedded in said block.

6. Frequency-control apparatus comprising a heater box, a tuning fork therein, a plurality of metallic blocks substantially surrounding said fork, at least one of said blocks being in contact therewith, means for supplying heat to said blocks, and means, including a thermal element embedded in one of said blocks, for regulating the heat supplied to said blocks.

7. Frequency-control apparatus comprising a heater box, a tuning fork therein, a portion of said fork being substantially surrounded by, and being in contact with, a mass of good heat-conducting material, means for supplying heat to said mass, and means, including a thermal element embedded in said mass, for regulating the heat supplied thereto.

8. Frequency-control apparatus comprising a tuning fork, having metallic block in contact therewith, means for supplying heat to said block for heating said fork, and means for controlling the temperature of said fork, said means comprising a thermostat having a portion thereof fastened in a metallic tube by means of heat-conducting wax, said tube being located in a hole in said block.

9. Frequency-control apparatus comprising a tuning fork, a fork holder comprising at least one heavy metallic block, a heater for supplying heat to said block whereby heat is transmitted through said block to said fork, and means responsive to temperature changes in said fork holder for controlling the heat supplied by said heater, said means comprising a thermal element in intimate contact with said block.

10. Frequency-control apparatus comprising a tuning fork, a fork holder, a heater for supplying heat thereto, a thermostat responsive to temperature changes in said fork holder, said thermostat having contact points, a three-electrode vacuum tube having a control electrode and an output circuit, said heater being supplied with current controlled by said output circuit, and means, including said thermostat contact points, for applying a negative potential to said control electrode in response to said temperature changes.

11. Frequency-control apparatus comprising a tuning fork, pick-up and driving coils therefor, an amplifier including a screen-grid tube, means for coupling said pick-up coil to the input of said amplifier, means for coupling said driving coil to the output of said amplifier, and means for adjusting the steady positive potential applied to the screen-grid of said tube.

12. Frequency-control apparatus comprising a tuning fork, pick-up and driving coils therefor, an amplifier including a screen-grid tube, means for coupling said pick-up coil to the input of said amplifier, means for coupling said driving coil to the output of said amplifier, and means for changing the phase relation between the current in said driving coil and the current in said pick-up coil, said means comprising a screen-grid tube.

13. Frequency-control apparatus comprising a tuning fork, a pick-up and driving coils therefor, an amplifier including a screen-grid tube, means for coupling said pick-up coil to the input of said amplifier, means for coupling said driving coil to the output of said amplifier, means for adjusting the steady positive potential applied to the screen-grid of said tube, and means for impressing a control frequency on said screen-grid.

14. In frequency-control apparatus, including a tuning fork having driving and pick-up coils connected to the output and input respectively of an amplifier containing a screen-grid tube, the method of adjusting the frequency at which said fork is driven which comprises the step of changing the value of the steady positive potential applied to the screen-grid of said tube.

15. Frequency-control apparatus comprising a tuning fork, pick-up and driving coils therefor, an amplifier including a screen-grid tube and a second tube coupled to the output of said screen-grid tube, means for coupling said pick-up coil to the input of said amplifier, means for coupling said driving coil to the output of said amplifier, and means for adjusting the steady positive potential applied to the screen-grid of the tube, one of said tubes being operated in its saturated condition whereby an adjustment of said steady screen-grid potential does not produce a large change in the magnitude of the output current of said amplifier.

In testimony whereof, I have hereunto subscribed my name this 27th day of January, 1931.

RALPH N. HARMON.